United States Patent
Li et al.

(10) Patent No.: US 9,236,789 B1
(45) Date of Patent: Jan. 12, 2016

(54) PROGRAMMABLE SNUBBER CIRCUIT

(71) Applicant: QUALCOMM Incorporated, San Diego, CA (US)

(72) Inventors: Shengyuan Li, Woodland Hills, CA (US); Chunlei Shi, San Diego, CA (US); Loc Nguyen, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/451,249

(22) Filed: Aug. 4, 2014

(51) Int. Cl.
*H02M 1/00* (2007.01)
*H02M 3/158* (2006.01)
*H02J 3/24* (2006.01)

(52) U.S. Cl.
CPC ............... *H02M 1/00* (2013.01); *H02M 3/158* (2013.01); *H02M 2001/0003* (2013.01)

(58) Field of Classification Search
USPC .......................................................... 307/102
See application file for complete search history.

(56) References Cited

U.S. PATENT DOCUMENTS

| 8,547,140 B1 | 10/2013 | Faucher et al. |
| 2010/0244796 A1 | 9/2010 | Chen et al. |
| 2011/0194313 A1 | 8/2011 | Yoshinaga |
| 2012/0069604 A1 | 3/2012 | Yagyu et al. |
| 2012/0112715 A1 | 5/2012 | Tong et al. |
| 2013/0049654 A1 | 2/2013 | Kure |
| 2013/0078933 A1 | 3/2013 | Soe |
| 2013/0207732 A1 | 8/2013 | Cabanillas et al. |

FOREIGN PATENT DOCUMENTS

| EP | 1249926 A2 | 10/2002 |
| JP | 2009027764 A | 2/2009 |
| WO | 9302518 A1 | 2/1993 |

OTHER PUBLICATIONS

International Search Report and Written Opinion—PCT/US2015/041010—ISA/EPO—Sep. 23, 2015.

*Primary Examiner* — Robert Deberadinis
(74) *Attorney, Agent, or Firm* — Fountainhead Law Group P.C.

(57) ABSTRACT

The present disclosure includes programmable snubber circuits and methods. In one embodiment, a circuit is configured between first and second power supply terminals. A programmable snubber circuit may be configured between the first and second power supplies to reduce ringing on the power supplies. In one embodiment, the circuit is a switching regulator and the power supply terminals are internal power supply terminals. The snubber circuit may be programmed to reduce ringing caused by switching currents through parasitic inductances in a package.

20 Claims, 3 Drawing Sheets

US 9,236,789 B1

PROGRAMMABLE SNUBBER CIRCUIT

BACKGROUND

The present disclosure relates to electronic systems and methods, and in particular, to programmable snubber circuits and methods.

Increasing speeds of electronic devices and the circuits that power them have focused attention on parasitic effects. For example, a conductive trace in an integrated circuit may exhibit both parasitic inductance and capacitance. Parasitic inductance, in particular, can cause unwanted ringing in a circuit as current through a conductive trace toward active circuit components operating at high frequencies. Ringing on internal nodes of a circuit may expose transistors and other circuit components to excessive voltage, which may impact reliability of the devices, for example. Such unwanted perturbations can degrade performance of a circuit.

SUMMARY

The present disclosure includes programmable snubber circuits and methods. In one embodiment, a circuit is configured between first and second power supply terminals. A programmable snubber circuit may be configured between the first and second power supplies to reduce ringing on the power supplies at certain frequencies. In one embodiment, the circuit is a switching regulator and the power supply terminals are internal power supply terminals. The snubber circuit may be programmed to reduce ringing caused by switching currents through parasitic inductances in a package, for example.

The following detailed description and accompanying drawings provide a better understanding of the nature and advantages of the present disclosure.

DETAILED DESCRIPTION

The present disclosure pertains to programmable snubber circuits. In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Figure 1:
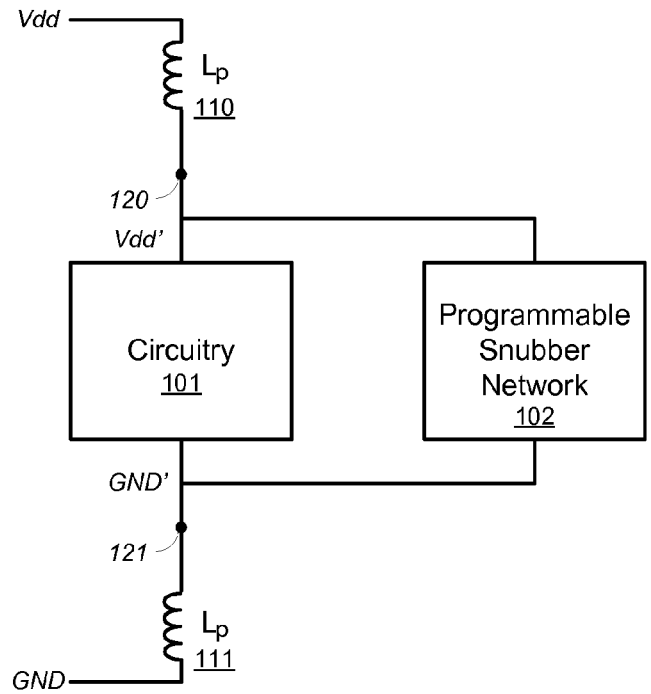
FIG. 1 illustrates a programmable snubber circuit according to one embodiment.

FIG. 1 illustrates a programmable snubber circuit according to one embodiment. Circuitry 101 may receive power from a first power supply terminal, Vdd. Current may flow from Vdd, through circuitry 101, and to a second power supply terminal such as ground, GND, for example. FIG. 1 illustrates two parasitic inductances, Lp, 110 and 111 between the power supply terminals Vdd and GND and in series with circuitry 101. Certain frequency components of current flowing from Vdd through parasitic inductance 110 may cause ringing on power supply voltage terminal, Vdd', at node 120, for example. Similarly, certain frequency components of the current flowing through parasitic inductance 111 to GND may cause ringing on the lower power supply voltage terminal, GND', at node 121 for example.

Features and advantages of the present disclosure include a programmable snubber circuit 102 configured in parallel with circuitry 101 to reduce the impact of parasitic inductances 110 and 111 and improve reliability and performance, for example. For instance, programmable snubber circuit 102 may have a first terminal coupled to the first power supply terminal Vdd via node 120 and a second terminal coupled to the second power supply terminal GND via node 121. In particular embodiments described in more detail below, the programmable snubber circuit 102 comprises a programmable capacitance and a programmable resistance configured in series with the first parasitic inductance Lp 110 and the second parasitic inductance Lp 111. The programmable capacitance may be configured to resonate with parasitic inductances 110 and 111 to reduce ringing at nodes 120 and 121, for example, and the parasitic resistance may be configured to set a quality factor for the resulting series RLC circuitry to improve performance in certain applications.

For example, a snubber may be a device used to suppress ("snub") voltage transients in electrical systems caused by frequency content in circuitry 101. Particular frequency content in circuitry 101 may cause parasitic inductances 110 and 111 to produce ringing above Vdd on node 120 and/or below ground on node 121, for example. Programmable snubber circuit 102 may include capacitance configured in series with inductances 110 and 111 so that the RLC circuit resonates at the frequencies of interest. Accordingly, the ringing caused by each parasitic inductance may be reduced at particular frequencies. Features and advantages of the some embodiments provide programmable capacitance that may be programmable across a range of values corresponding to a range of unknown values for the first parasitic inductance 110 and the second parasitic inductance 111. In some applications, the exact value of each parasitic inductance may be unknown. How much capacitance is needed depends on the total magnetic energy stored in the parasitic inductance. However, it may be known that the inductance values are within a known range of values. The capacitances are therefore configured to be programmable across a corresponding range of values so that one of the programmed values of capacitance resonates with the unknown parasitic inductance to reduce ringing.

In one embodiment, once the capacitances are programmed to resonate with the parasitic inductances, for example, the programmable resistance may be programmed to set a quality factor ("Q"). The choice of the damping resistance in series with the capacitance is a trade-off between the efficiency and the peak ringing, and hence reliability. As described further below, the quality factor, or Q factor, is a dimensionless parameter that describes how under-damped an oscillator or resonator is, or equivalently, characterizes a resonator's bandwidth relative to its center frequency.

A system with low quality factor ($Q<\frac{1}{2}$) is considered overdamped. Such a system may not oscillate. When displaced from its equilibrium steady-state output it returns to it by exponential decay, approaching the steady state value asymptotically, for example. It has an impulse response that is the sum of two decaying exponential functions with different rates of decay. As the quality factor decreases the slower decay mode becomes stronger relative to the faster mode and dominates the system's response resulting in a slower system. A system with high quality factor (Q>½) is considered underdamped. Underdamped systems combine oscillation at a specific frequency with a decay of the amplitude of the signal. Underdamped systems with a low quality factor (a little above Q=½) may oscillate only once or a few times before dying out. As the quality factor increases, the relative amount of damping decreases. A system with an intermediate quality factor (Q=½) is said to be critically damped. Like an overdamped system, the output does not oscillate, and does not overshoot its steady-state output (i.e., it approaches a steady-state asymptote). Like an underdamped response, the output of such a system responds quickly to a unit step input. Critical damping results in the fastest response (approach to the final value) possible without overshoot. In an ideal series RLC circuit, the Q factor is:

$$Q=(1/R)*\text{sqrt}(L/C)=wo*L/R,$$

where R, L and C are the resistance, inductance and capacitance of the RLC circuit, respectively. The larger the series resistance, the lower the circuit Q. Accordingly, similar to the case above with the capacitances, the resistances may be configured to be programmable across a range of values corresponding to a known range of unknown inductor values so that one of the programmed values of resistance sets a desired Q with the unknown parasitic inductance and programmed capacitance.

Figure 2:
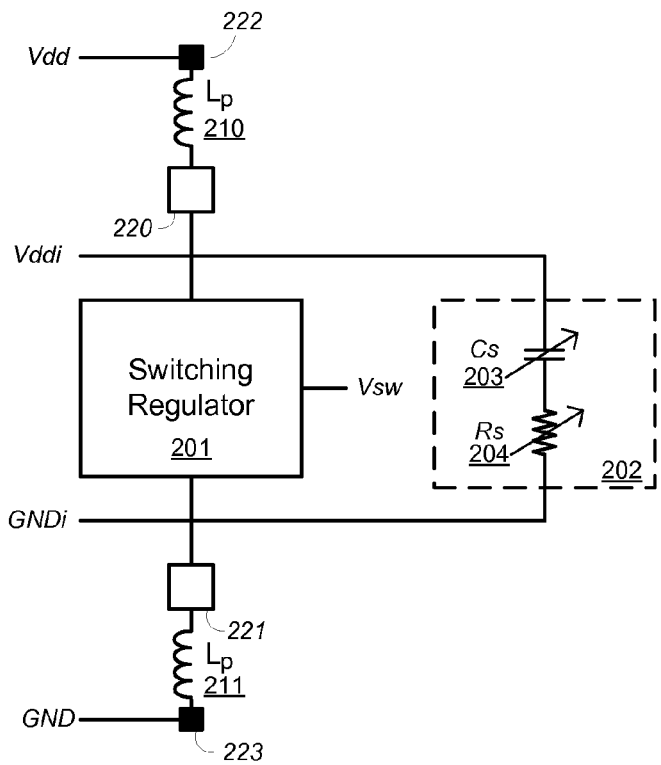
FIG. 2 illustrates a programmable snubber circuit in a switching regulator according to one embodiment.

FIG. 2 illustrates an example embodiment where the circuitry is a switching regulator operating at a particular switching frequency, fsw. Switching regulator 201 may be configured on an integrated circuit (IC) to receive a power supply voltage Vdd on a first terminal comprising a first package pin 222 and receive ground on a second terminal comprising a second package pin 223. Pin 222 and pin 223 may be coupled to a semiconductor die (or chip) pads 220 and 221, respectively, using package conductors such as bondwires, solder bumps, etc. Package conductors may comprise parasitic inductances Lp 210 and 211, which may have substantially the same parasitic inductances values for some package embodiments. Accordingly, switching regulator 201 may receive Vdd through inductance 210 resulting in an internal power supply voltage Vddi from pad 220. Similarly, ground may be coupled to switching regulator 201 through inductance 211 resulting in an internal ground GNDi from pad 221. As described in more detail below, switching regulator 201 may alternately connect/disconnect pad 220 and 221 to an output node at the switching frequency, fsw, to produce an output voltage Vsw that alternates between Vddi and GNDi, for example. Accordingly, current through inductances 210 and 211 may attempt to switch from a low current value to a high current value at the switching frequency, fsw, which may cause ringing on the internal supplies Vddi and GNDi. Such ringing may expose transistors in switching regulator 201 to high voltages that may impact reliability, for example.

A programmable snubber circuit 202 is coupled between the internal supply Vddi and internal ground GNDi to suppress ringing and maintain Vddi close to Vdd and GNDi close to GND at the switching frequency fsw, for example. Programmable snubber circuit 202 may include a programmable capacitance (Cs) 203 and a programmable resistance (Rs) 204. In one embodiment, Cs is programmed first. In one embodiment, Cs is configured to reduce, and possibly, minimize ringing with parasitic inductances 210 and 211. In one example embodiment, Cs may be programmed to form a resonant circuit with inductances 210 and 211 to minimize the impedance on pads 220 and 221, for example. Next, in this example, Rs may be programmed to set a particular quality factor, Q, of the RLC circuit to obtain a desired efficiency and reliability performance according to the needs of the design. Accordingly, ringing on Vddi and GNDi caused by switching currents in the switching regulator 201 may be reduced to improve the reliability of the circuit.

Figure 3:
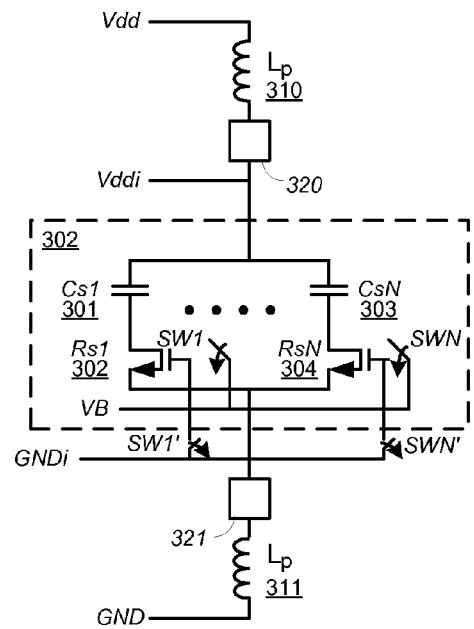
FIG. 3 illustrates an example of programmable capacitance according to one embodiment.

FIG. 3 illustrates an example of programmable capacitance according to one embodiment. In this example, a programmable snubber circuit 302 is coupled between a pad 320 having an internal power supply voltage Vddi and a pad 321 having an internal ground voltage GNDi. Circuit 302 includes a plurality of capacitors (Cs1-CsN) arranged in parallel with each other and in series with parasitic inductances Lp 310 and 311. Each capacitance may be switched into series with Lp 310 and 311 to form an LC circuit. Alternatively, each capacitance may be open circuited, and thereby disconnected from the snubber circuit. In this example, N parallel capacitors Cs1-CsN may be selectively switched into an LC circuit using N transistors illustrated at 302 and 304. For example, capacitor 301 may have a first terminal coupled to a terminal of Lp 310 and a second terminal coupled to a first terminal (e.g., a drain) of transistor 302. A second terminal (e.g., a source) of transistor 302 is coupled to a first terminal of Lp 311. A control terminal (e.g., a gate) of transistor 302 is coupled to a "turn on" bias voltage, VB, through a first switch SW1 to turn on transistor 302 when SW1 is closed (and SW1' is open). The control terminal of transistor 302 is coupled to a "turn off" voltage through a second switch SW1' to turn transistor 302 off when SW1' is closed and SW1 is open. In this example, transistors 302 and 304 are NMOS transistors, so the "turn off" voltage is internal ground, GNDi. Other transistors may use other voltages to turn off, for example. Additional capacitors are similarly configured as illustrated by capacitor CsN 303, transistor 304, and switches SWN and SWN' to selectively configure particular capacitors Cs in series with the Lp 310 and Lp 311 or disconnect particular capacitors Cs from the programmable snubber circuit. Accordingly, the total capacitance in series with Lp 310 and 311 may be modified to configure a combination of capacitors to reduce ringing for particular values of Lp 310 and Lp 311. In one embodiment, one of the capacitors is larger than the other capacitors to set a base value (e.g., 4 nF) and the other capacitors are the same size to set incremental increases (e.g., 0.5 nF) in capacitance of the snubber. The base value may correspond to a low end of a range of capacitance values that may be used to compensate for parasitic inductance within a known range, and the other capacitors may set equal increments above the base value to a high end of the range (i.e., a maximum programmed capacitance value) so that the range of capacitor values may be used to compensate for an unknown parasitic inductance within a known range, for example.

In one embodiment, the "turn on" voltage is configured to turn on a transistor so that the transistor has a particular ON resistance. For example, VB may bias transistor 302 so that the drain-to-source path presents a particular resistance in series with the capacitor Cs1 and inductances Lp. Resistance of the transistors may set the quality factor Q of the circuit to constrain ringing and maintain the total voltage across internal power supply Vddi and internal GNDi below some threshold, for example. Thus, transistors 302 and 304 are labeled Rs1 and RsN representing their resistive properties when turned on.

Figure 4:
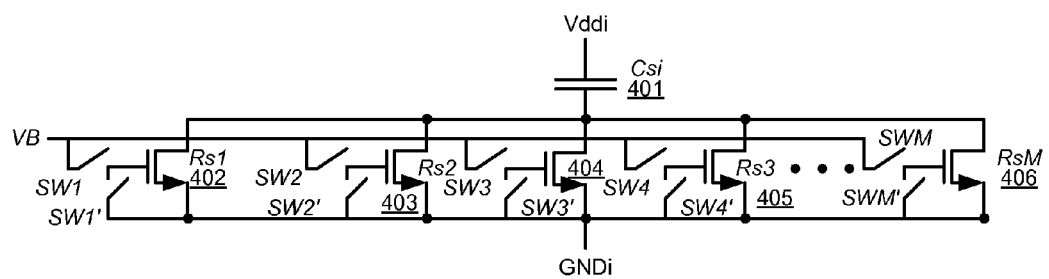
FIG. 4 illustrates an example of programmable resistance according to one embodiment.

FIG. 4 illustrates an example of programmable resistance according to one embodiment. In this example, the resistance in series with a particular capacitor Csi 401 in the programmable snubber circuit may be modified to adjust the Q of the RLC circuit. For instance, M transistors illustrated at 402-406 may be configured in parallel with each other. A terminal (e.g., a drain) of each transistor 402-406 is coupled to a first terminal of capacitor 401, which may be one capacitor out of multiple parallel capacitors as shown in FIG. 3, for example. A second terminal (e.g., a source) of each transistor 402-406 may be coupled to internal ground, GNDi, and to a terminal of Lp 111 in FIG. 1, for example. Each transistor 402-406 comprises a control terminal (e.g., a gate) coupled to two switches. A first switch is used to turn the transistor off as illustrated by switches SW1'-SWM' by coupling the control terminal to GNDi. A second switch is used to turn the transistor on as illustrated by switches SW1-SWM, which couple the control terminal of a particular transistor to a bias voltage VB when the corresponding switch SWX is closed. Accordingly, the switches may independently configure any one or more of the transistors to be in series with a particular capacitor Csi by turning the transistors on. For example, when all of switches SW1-SW4 are open and all of switches SW1'-SW4' are closed, all M transistors are off and the particular capacitor Csi is not included in the snubber circuit. However, if any one of switches SW1-SW4 are closed (e.g., SW1), and a corresponding one of SW1'-SW4' is opened (e.g., SW1'), the particular transistor (e.g., 401) turns on, thereby including an additional capacitance, Csi, in the snubber circuit in series with a resistance (e.g., Rs1) set by VB. In one embodiment, the transistors 402-406 are the same size, and the resistance may be reduced by incorporating additional transistors in parallel. Accordingly, a digital signal may configure a particular resistance in series with a particular capacitor to set the Q of the RLC circuit. In some embodiments the resistances may be the same, and in other embodiments the resistances may be different (e.g., binary weighted).

Figure 5:
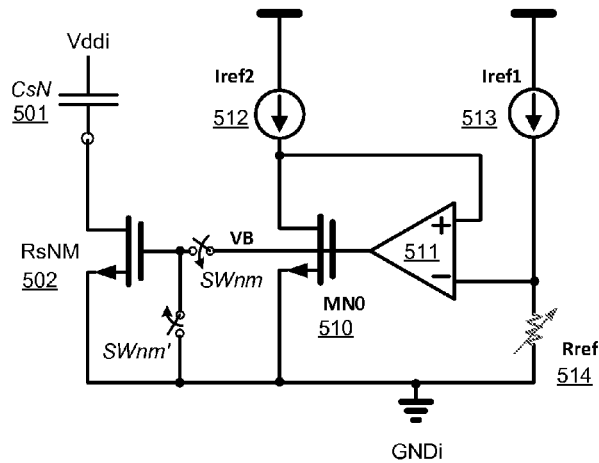
FIG. 5 illustrates an example bias circuit according to one embodiment.

FIG. 5 illustrates an example bias circuit according to one embodiment. N capacitors in a snubber circuit are illustrated by capacitors CsN 501 that each have M transistors as resistive elements RsNM 502, which may be selectively turned on and off using switches SWnm and SWnm'. A bias circuit comprising transistor 510, differential amplifier 511, current sources 512-513, and a reference resistor 514 produces bias voltage VB to turn on each transistor with a particular on resistance. In one embodiment, reference resistor Rref 514 may be programmable to change the on resistance set by VB, for example. Current from current source Iref1 513 is coupled through resistor Rref and the resulting voltage applied to the negative input of amplifier 511. Similarly, current from current source Iref2 512 is coupled through reference transistor MN0 510 and the resulting voltage at the drain of transistor 510 is applied to the positive input of amplifier 511. Accordingly, the output of amplifier 511 will bias MN0 510 such that the ON resistance of transistor 510 is set as follows:

$$Rs\_mn0 = Iref1 * Rref/Iref2.$$

Accordingly, the resistance of each transistor RsNM (or the fine resistive steps) may be adjusted by adjusting Iref1, Iref2, or Rref, for example.

Figure 6:
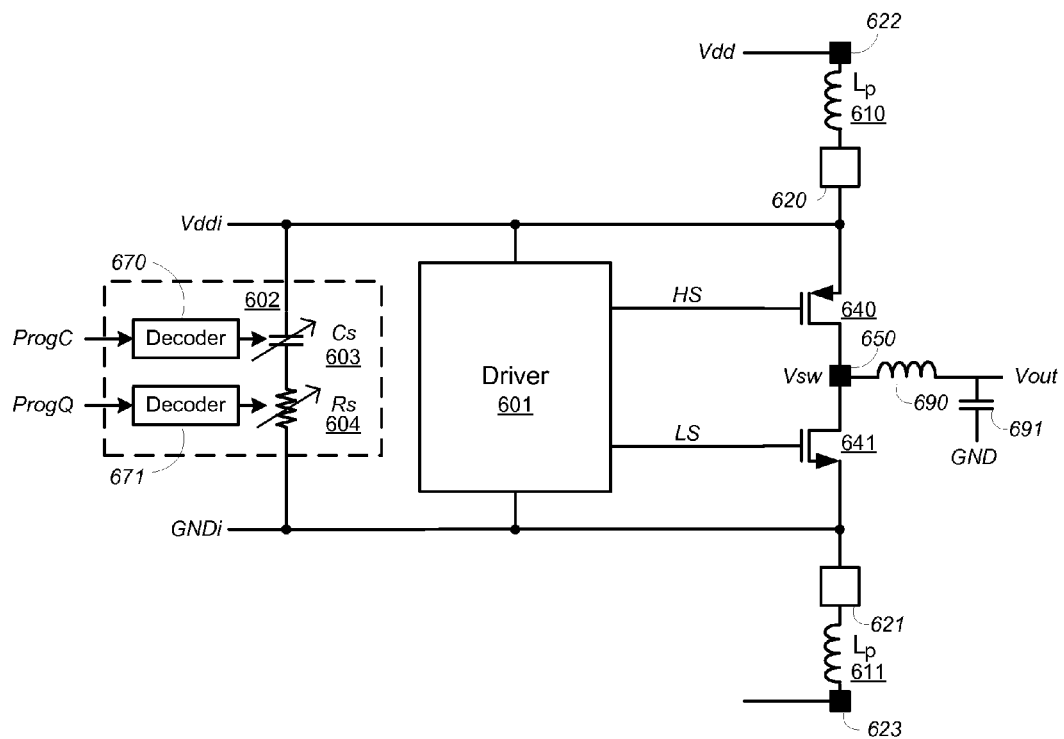
FIG. 6 illustrates an example switching regulator with a programmable snubber circuit according to one embodiment.

FIG. 6 illustrates an example switching regulator with a programmable snubber circuit 602 according to one embodiment. FIG. 6 illustrates a buck regulator, also known as a down converter, which receives an input voltage, Vdd, and produces a regulated output voltage Vout (e.g., Vout<Vdd, feedback not shown) stored across output capacitor 691. A driver circuit 601 produces pulse width modulated (PWM) signals HS and LS to alternately turn PMOS transistor switch 640 and NMOS transistor switch 641 ON and OFF over a switching cycle to couple current from Vdd and ground into inductor 690, respectively. The transistor switches 640 and 641 are turned ON and OFF in accordance with a switching frequency fsw. Accordingly, switching node 650 is alternately connected to an internal power supply voltage Vddi and internal ground GNDi at the switching frequency so that the switching node voltage Vsw transitions between Vddi and GNDi.

The internal power supply voltages Vddi and GNDi are coupled to external power supply terminals Vdd and GND through package conductors between pads 620 and 621 and package pins 622 and 623, respectively. Each package conductor may have parasitic inductance Lp 610 and 611, which may induce voltage ringing on the internal supply voltage Vddi and internal ground GNDi as the current through the package conductors is switched on and off at the switching frequency fsw. Ringing on Vddi and GNDi is reduced using programmable snubber circuit 602, which includes a programmable capacitance 603 and programmable resistance 604 as described herein. Accordingly, in some example embodiments, a terminal of each capacitor in a programmable capacitance 603 may be coupled to Vddi and Lp 610 and a terminal of transistors in a programmable resistance 604 may be coupled to GNDi and Lp 611.

Programmable snubber circuit 602 may include one or more circuits for receiving control signals and configuring the capacitance and resistance to reduce ringing of internal power supply nodes. In this example, snubber circuit 602 includes a decoder 670 that receives a digital signal ProgC to program capacitance Cs 603. Digital data may be used to open and close particular switches SWx and SWx' to set a capacitance as described above, for example. In this example, snubber circuit 602 further includes a decoder 671 that receives a digital signal ProgQ to program resistance Rs 604. Digital data may be used to open and close particular switches SWx and SWx' to set a resistance on each capacitance as described above to set a quality factor for the circuit, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A circuit comprising:
   a first power supply terminal comprising a first parasitic inductance;
   a second power supply terminal comprising a second parasitic inductance;
   a circuit having a first terminal coupled to the first power supply terminal and a second terminal coupled to the second power supply terminal; and
   a programmable snubber circuit having a first terminal coupled to the first power supply terminal and a second terminal coupled to the second power supply terminal, the programmable snubber circuit comprising a programmable capacitance and a programmable resistance configured in series with the first parasitic inductance and the second parasitic inductance,
   wherein the programmable capacitance is programmed to reduce ringing from the first parasitic inductance at the first terminal of the circuit and reduce ringing from the second parasitic inductance at the second terminal of the circuit at a particular frequency, and wherein the programmable resistance is programmed to set a quality factor.

2. The circuit of claim 1 wherein the programmable snubber circuit comprises of a plurality of capacitors, each capacitor being programmably configured in series with the first parasitic inductance and the second parasitic inductance, wherein the plurality of capacitors are arranged in parallel with each other.

3. The circuit of claim 2, the programmable snubber circuit further comprising a plurality of switches, wherein the plurality of switches are operable to selectively configure particular capacitors of the plurality of capacitors in series with the first parasitic inductance and the second parasitic inductance or disconnect the particular capacitors from the programmable snubber circuit.

4. The circuit of claim 3, the programmable snubber circuit further comprising a plurality of transistors, wherein each transistor is configured in series with a particular capacitor in the plurality of capacitors, and wherein a control terminal of each of the plurality of transistors is coupled to a turn on voltage through one of the plurality of switches and the control terminal of each of the plurality of transistors is coupled to a turn off voltage through another one of the plurality of switches.

5. The circuit of claim 1 wherein the programmable resistance comprises a plurality of transistors configured in parallel.

6. The circuit of claim 5 wherein each transistor of the plurality of transistors is coupled to one capacitor.

7. The circuit of claim 5 wherein each transistor in the plurality of transistors is selectively coupled to a bias voltage to produce a particular resistance.

8. The circuit of claim 1 wherein the programmable capacitance is configured to be programmable across a range of values corresponding to a range of unknown values for the first parasitic inductance and the second parasitic inductance.

9. The circuit of claim 1 wherein the circuit is a switching regulator.

10. The circuit of claim 1 wherein the first parasitic inductance and the second parasitic inductance are package conductors of an integrated circuit package.

11. A method comprising:
receiving a first power supply voltage on a first power supply terminal of a circuit;
receiving a second power supply voltage that is less than the first power supply voltage on a second power supply terminal of the circuit;
programming a capacitance to reduce ringing caused by current through a first parasitic inductance and a second parasitic inductance at a particular frequency;
programming a resistance to set a quality factor,
wherein the capacitance and the resistance are configured in series with the first parasitic inductance and the second parasitic inductance between the first power supply terminal and the second power supply terminal,
wherein the circuit is coupled to the first power supply terminal through the first parasitic inductance and the circuit is coupled to the second power supply terminal through the second parasitic inductance.

12. The method of claim 11 wherein programming the capacitance comprises selecting one or more of a plurality of capacitors, each capacitor being programmably configured in series with the first parasitic inductance and the second parasitic inductance, wherein the plurality of capacitors is arranged in parallel with each other.

13. The method of claim 12 wherein selecting the one or more of a plurality of capacitors comprises activating particular switches of a plurality of switches.

14. The method of claim 13 wherein selecting the one or more of a plurality of capacitors comprises turning on selected transistors of a plurality of transistors, wherein each transistor is configured in series with a particular capacitor in the plurality of capacitors, and wherein a control terminal of each of the plurality of transistors is coupled to a turn on voltage through one of the plurality of switches and the control terminal of each of the plurality of transistors is coupled to a turn off voltage through another one of the plurality of switches.

15. The method of claim 11 wherein programming the resistance comprises selecting one or more of a plurality of transistors configured in parallel.

16. The method of claim 15 wherein each transistor of the plurality of transistors is coupled to one capacitor.

17. The method of claim 15 wherein each transistor in the plurality of transistors is selectively coupled to a bias voltage to produce a particular resistance.

18. The method of claim 11 wherein the capacitance is configured to be programmable across a range of values corresponding to a range of unknown values for the first parasitic inductance and the second parasitic inductance.

19. The method of claim 11 wherein the first parasitic inductance and the second parasitic inductance are package conductors of an integrated circuit package.

20. The method of claim 11 wherein the circuit is a switching regulator.

* * * * *